United States Patent
Muller et al.

(10) Patent No.: US 12,390,805 B2
(45) Date of Patent: Aug. 19, 2025

(54) METHODS OF ISOLATING BIOMARKER CELLS

(71) Applicant: BIOFLUIDICA, INC., San Diego, CA (US)

(72) Inventors: Rolf Muller, Del Mar, CA (US); Scott Beach, San Marcos, CA (US); Judy Muller-Cohn, Del Mar, CA (US)

(73) Assignee: BioFluidica, Inc., Lawrence, KS (US)

( * ) Notice: Subject to any disclaimer, the term of this patent is extended or adjusted under 35 U.S.C. 154(b) by 0 days.

(21) Appl. No.: 18/631,612

(22) Filed: Apr. 10, 2024

(65) Prior Publication Data

US 2025/0083140 A1 Mar. 13, 2025

Related U.S. Application Data

(60) Division of application No. 16/577,031, filed on Sep. 20, 2019, which is a continuation of application No. PCT/US2018/028611, filed on Apr. 20, 2018.

(60) Provisional application No. 62/487,690, filed on Apr. 20, 2017.

(51) Int. Cl.
  *B01L 3/00* (2006.01)
  *B01L 3/02* (2006.01)
  *G01N 35/10* (2006.01)

(52) U.S. Cl.
  CPC ....... *B01L 3/0237* (2013.01); *B01L 3/502715* (2013.01); *G01N 35/1016* (2013.01); *B01L 2200/0668* (2013.01); *B01L 2200/0689* (2013.01); *B01L 2300/0663* (2013.01); *G01N 35/1011* (2013.01); *G01N 35/109* (2013.01)

(58) Field of Classification Search
  CPC ............ B01L 3/0237; B01L 3/502715; B01L 2200/0668; B01L 2200/0689; B01L 2300/0663; B01L 2200/0652; B01L 2200/027; B01L 2200/0647; B01L 3/5027; G01N 35/1016; G01N 35/1011; G01N 35/109; G01N 2035/00158; G01N 33/57492; G01N 33/577; G01N 15/1484; G01N 33/5005; G01N 33/54386; G01N 35/1065; G01N 2015/1006; C12M 23/16
  See application file for complete search history.

(56) References Cited

U.S. PATENT DOCUMENTS 6,193,471 B1 2/2001 Paul
6,685,668 B1 2/2004 Cho et al.
6,869,571 B2 3/2005 Ingenhoven et al.
(Continued)

FOREIGN PATENT DOCUMENTS

CN  105899954 A  8/2016
CN  105950469 A  9/2016
(Continued)

OTHER PUBLICATIONS

EPO Communication pursuant to Article 94(3) EPC for Application No. 18786962.3 dated Jul. 9, 2024, 8 pages.
(Continued)

*Primary Examiner* — Dean Kwak
(74) *Attorney, Agent, or Firm* — Julia A. Kim; In Vivo Patent Law

(57) ABSTRACT

The presently disclosed subject matter provides methods of isolating biomarker cells from a liquid sample, and related methods of capturing DNA or RNA released from biomarker cells.

4 Claims, 13 Drawing Sheets

(56) References Cited

U.S. PATENT DOCUMENTS

| | | | |
|---|---|---|---|
| 6,915,679 | B2 | 7/2005 | Chien et al. |
| 7,858,040 | B2 | 12/2010 | Okun et al. |
| 8,287,820 | B2 | 10/2012 | Williams et al. |
| 8,394,645 | B2 | 3/2013 | Beebe et al. |
| 8,425,840 | B2 | 4/2013 | Hosokawa et al. |
| 8,470,246 | B2 | 6/2013 | Rich |
| 8,557,570 | B2 | 10/2013 | Sahoo et al. |
| 9,081,001 | B2 | 7/2015 | Cook et al. |
| 9,339,815 | B2 | 5/2016 | Kim et al. |
| 9,375,531 | B1 | 6/2016 | Lee et al. |
| 9,500,664 | B2 | 11/2016 | Ness et al. |
| 2003/0236489 | A1 | 12/2003 | Jacobson et al. |
| 2006/0193730 | A1 | 8/2006 | Rosenstein et al. |
| 2006/0257290 | A1* | 11/2006 | Shimizu .................. B01L 3/502 422/400 |
| 2008/0131323 | A1 | 6/2008 | Kuczenski et al. |
| 2009/0014360 | A1 | 1/2009 | Toner et al. |
| 2009/0229979 | A1 | 9/2009 | Champagne |
| 2010/0291584 | A1 | 11/2010 | Tseng et al. |
| 2012/0128538 | A1 | 5/2012 | Miller et al. |
| 2012/0244043 | A1 | 9/2012 | Leblanc et al. |
| 2013/0078733 | A1 | 3/2013 | Holmes et al. |
| 2014/0238122 | A1 | 8/2014 | Mostowfi et al. |
| 2015/0251181 | A1 | 9/2015 | Saito |
| 2016/0289669 | A1 | 10/2016 | Fan et al. |
| 2016/0339431 | A1 | 11/2016 | Shmilovich et al. |
| 2018/0272346 | A1 | 9/2018 | Griffith et al. |

FOREIGN PATENT DOCUMENTS

| | | |
|---|---|---|
| EP | 1206966 A1 | 5/2002 |
| EP | 1712285 A1 | 10/2006 |
| JP | 2011512125 A | 4/2011 |
| JP | 2013-524171 A | 6/2013 |
| JP | 2015-166707 A | 9/2015 |
| WO | 2009/069656 A1 | 6/2009 |
| WO | 2012/056369 A1 | 5/2012 |
| WO | 2016024941 A1 | 2/2016 |
| WO | 2016118915 A1 | 7/2016 |
| WO | 2016201163 A1 | 12/2016 |

OTHER PUBLICATIONS

Dynamic Devices, "Liquid Handling Robotics", printed on Feb. 28, 2017, 8 pages.
Dynamic Devices, "VVP On-The-Fly Pipetting Correction," printed on Feb. 28, 2017, 3 pages.
Dynamic Devices, "VVP Real Time Transfer Validation," printed on Feb. 28, 2017, 3 pages.
Elveflow, "How to Choose the Right Microfluidic Flow Control System?", printed on Feb. 19, 2017, 17 pages.
Hamilton Robotics, "Microlab STAR Line—Artificial Intelligence with Hamilton Robotics", 2013, 36 pages.
International Search Report and Written Opinion (Corrected) received in Patent Cooperation Treaty Application No. PCT/US2018/028611, dated Feb. 18, 2019, 10 pages.
Sadeghi, Sahl, et al., "A Simple, Bubble-Free Cell Loading Technique for Culturing Mammalian Cells on Lab-on-a-Chip Devices", Royal Society of Chemistry, Feb. 28, 2017, 5 pages.
Written Opinion received in Patent Cooperation Treaty Application No. PCT/US2018/028611, dated Feb. 18, 2019, 5 pages.
Partial Supplemental Search Report received in European Application No. 18786962.3, dated Mar. 19, 2020.
Decision to Grant a Patent received in Japanese Application No. 557776/2019, dated Apr. 8, 2020.
Extended Search Report received in European Application No. 18786962.3, dated Jun. 26, 2020, 11 pages.
Office Action with English Translation received in Chinese Application No. 201880026055.6, dated Jun. 15, 2020, 14 pages.
Second Office Action and Translation received in Chinese Patent Application No. 201880026055.6, dated Jan. 18, 2021, 19 pages.
Response to European Search Report filed with the European Patent Office, dated Jan. 22, 2021, 23 pages.
China National Intellectual Property Administration, Notification of Reexamination for CN Application No. 2018800260556 issued on Oct. 11, 2023 (includes translation).
Office Action received in European Application No. 18786962.3, dated May 19, 2022, 5 pages.
Request for Reexamination with Remarks, and amendments to specification, claims, and figures as filed in Chinese Patent Application No. 201880026055.6, dated Nov. 15, 2021; and translation of Remarks on pp. 2-6 (at pp. 64-69); 69 pages.
Response to Second Office Action filed in Chinese Patent Application No. 201880026055.6, dated May 25, 2021, 10 pages; and corresponding translation.
Response to First Office Action and Translation filed in Chinese Patent Application No. 201880026055.6, dated Oct. 20, 2020, 12 pages.
Response to Partial Search Report filed in European Application No. 18786962.3, dated Jun. 1, 2020, 2 pages.

* cited by examiner

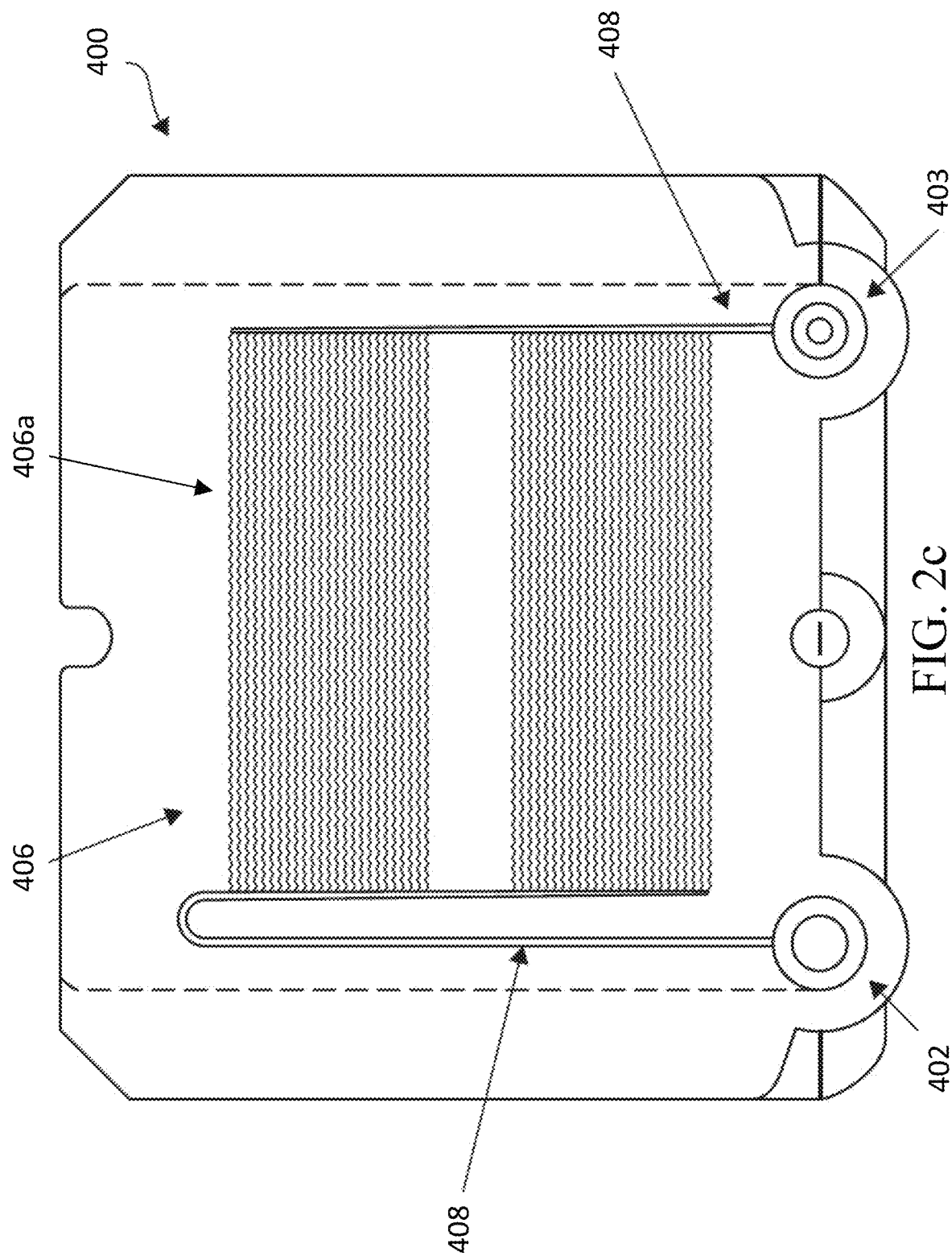

METHODS OF ISOLATING BIOMARKER CELLS

CROSS REFERENCE TO RELATED APPLICATIONS

This application is a divisional of U.S. application Ser. No. 16/577,031, filed Sep. 20, 2019, which is a continuation of Patent Cooperation Treaty Application No. PCT/US2018/028611 entitled "FLUID-TIGHT FLOW SYSTEM TO ISOLATE BIOMARKERS FROM A LIQUID SAMPLE," which was filed on Apr. 20, 2018, which claims benefit of and priority to U.S. Provisional Patent Application No. 62/487,690 filed on Apr. 20, 2017, the contents of each of which are hereby incorporated by reference in their entirety.

FIELD

The present invention relates generally methods of isolating biomarker cells from a liquid sample, and related methods of capturing DNA or RNA released from biomarker cells.

BACKGROUND

Conventional liquid handling systems are used to transport and operate on volumes of liquid. For example, one or more liquid samples may be provided in containers (e.g., microwell plates or vials) in a liquid handling system. The liquid handling system may include one or more pipettors that are used to remove (e.g., by aspirating) portions of the samples from the containers and/or to add (e.g., by dispensing) material to the samples in the containers. Standard pipetting systems only use one pipette at a time to dispense or collect samples.

Liquid handlers may be used to directly inject samples from a pipettor into a macro-scale fluidic systems, such as a flow cytometer, (U.S. Pat. No. 7,858,040) in conjunction with a separate pump system, such as the Hamilton PSD3 Servo syringe pump, to control fluid flow. With respect to microfluidic chips, capillary connectors are typically used in conjunction with syringe pumps or separate pressure supply devices to deliver liquid patient samples to microfluidic chips (as in the Elveflow microfluidic flow control system).

SUMMARY OF THE INVENTION

The presently disclosed subject matter describes a fluid-tight flow system comprising a microfluidic chip comprising an inlet port in fluid communication with an outlet port; a first automated pipetting channel comprising a first pump, and a first pipette tip containing a liquid sample and coupled to the inlet port; a second automated pipetting channel comprising a second pump, and a second pipette tip coupled to the outlet port; and a non-transitory computer readable medium in communication with the first pump and the second pump, and programmed to command the first pump of the first automated pipetting channel and the second pump of the second automated pipetting channel to control flow of the liquid sample through the microfluidic chip. In some embodiments, the first pump or the second pump comprises a plunger and a pipetting drive motor. In some embodiment, the first pump or the second pump comprises a piston contained within the first pipette tip and a pipetting drive motor.

In some embodiments, the fluid-tight flow system further comprises closed-loop feedback control wherein the first automated pipetting channel further comprises a first pressure sensor; the second automated pipetting channel further comprises a second pressure sensor; and the non-transitory computer readable medium is further in communication with the first pressure sensor and second pressure sensor; wherein said non-transitory computer readable medium is further programmed to receive data from the first pressure sensor in real-time and data from the second pressure sensor in real-time, and adjust command of at least the first pump of the first automated pipetting channel or the second pump of the second automated pipetting channel to adjust flow through the microfluidic chip using real-time feedback based on said data from the first pressure sensor and the second pressure sensor. In some embodiments, the real-time feedback based on said data from the first pressure sensor and the second pressure sensor comprises detection at, above or below a pressure threshold or a flow rate threshold.

In some embodiments, the liquid sample is a bodily fluid. In some embodiments, the bodily fluid is blood, saliva, lymphatic fluid, cells suspended in fluid, synovial fluid, semen, urine, cerebrospinal fluid, or amniotic fluid.

In some embodiments, the microfluidic chip further comprises a cell selection module, a plasma isolation module, or a solid-phase extraction module in fluid communication with the inlet and the outlet port. In some embodiments, the microfluidic chip comprises a cell selection module and said cell selection module comprises a capture bed in fluid communication with the inlet port and the outlet port.

In some embodiments, the capture bed comprises a plurality of isolation channels configured to isolate biomarker cells from the liquid sample, solid supports configured to bind to biomarker cells, or a filter substrate configured as a size-based separator for biomarker cells. In some embodiments, the filter substrate is a microcavity array. In some embodiments, the solid supports are pillars, beads, or resins. In some embodiments, the plurality of isolation channels are configured to isolate circulating tumor cells or circulating leukemic cells.

In some embodiments, the liquid sample is blood and the microfluidic chip comprises a plasma isolation module configured to separate plasma from red blood cells and white blood cells. In some embodiments, the liquid sample is plasma and the microfluidic chip comprises a solid-phase extraction module configured to extract cfDNA, ctDNA, or exosomes from plasma. In some embodiments, the solid-phase extraction module comprises an extraction bed in fluid communication with the inlet port and the outlet port. In some embodiments, the extraction bed comprises extraction channels configured to extract cfDNA, ctDNA, or exosomes from plasma; solid supports configured to bind cfDNA, ctDNA, or exosomes; or a filter substrate configured as a size-based separator for exosomes. In some embodiments, the solid supports are pillars, beads, or resins.

In some embodiments, the liquid sample is blood and the microfluidic chip further comprises a plasma isolation module configured to separate plasma from red blood cells and white blood cells and a solid-phase extraction module configured to extract cfDNA, ctDNA, or exosomes from plasma; and each module is in fluid communication with each other module, and the inlet and the outlet port.

In some embodiments, the liquid sample is blood and the microfluidic chip further comprises a solid-phase extraction module configured to lyse biomarker cells and capture DNA or RNA released from lysed biomarker cells; and each module is in fluid communication with each other module, and the inlet and the outlet port.

In some embodiments, the microfluidic chip further comprises a reaction module in fluid communication with the inlet and the outlet port. In some embodiments, the reaction module is a continuous flow thermal reactor. In some embodiments, the reaction module is configured for reverse transcription, an enzymatic digestion reaction, or a primer extension reaction. In some embodiments, the reaction module is configured for polymerase chain reaction, quantitative polymerase chain reaction, or reverse-transcript polymerase chain reaction.

In some embodiments, the microfluidic chip further comprises a processing module in fluid communication with the inlet and the outlet port. In some embodiments, the processing module is configured to co-encapsulate an individual cell with a barcoded microparticle in a droplet. In some embodiments, the processing module is a flow purification module configured to purify target nucleic acid molecules from excess non-target nucleic acid nucleotide components. In some embodiments, the processing module is configured for cell lysis, DNA purification, or electrophoresis.

In some embodiments, the microfluidic chip further comprises a diagnostic module in fluid communication with the inlet and the outlet port. In some embodiments, the diagnostic module is a nanosensor module comprising nanotubes configured to detect or identify a single molecule or a nucleotide. In some embodiments, the diagnostic module is a hybridization sequencing module configured to expose a nucleotide sequence to probes and detect hybridized probes. In some embodiments, the diagnostic module is configured to detect or identify a single molecule or a nucleotide. In some embodiments, the diagnostic module is configured for fluorescence in situ hybridization. In some embodiments, the diagnostic module is configured for protein crystallization or mass spectrometry.

The presently disclosed subject matter also describes a method of isolating biomarker cells from a liquid sample comprising providing a fluid-tight flow system described herein, wherein the non-transitory computer readable medium programmed to command the first pump of the first automated pipetting channel and the second pump of the second automated pipetting channel to control flow of the liquid sample through the microfluidic chip comprises programming to control flow of the liquid sample through the cell selection module; controlling flow of the liquid sample through the cell selection module; and isolating biomarker cells from the liquid sample. In some embodiments, biomarker cells are circulating tumor cells.

The presently disclosed subject matter also describes a method of extracting cfDNA, ctDNA, or exosomes from plasma comprising providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the solid-phase extraction module; controlling flow of plasma through the solid-phase extraction module; and extracting cfDNA, ctDNA, or exosomes from plasma.

The presently disclosed subject matter also describes a method of extracting cfDNA, ctDNA, or exosomes from blood comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the plasma isolation module and the solid-phase extraction module; controlling flow of blood through the plasma isolation module; separating plasma from red blood cells and white blood cells; controlling flow of plasma through the solid-phase extraction module; and extracting cfDNA, ctDNA, or exosomes from plasma.

The presently disclosed subject matter also describes a method of capturing DNA or RNA released from biomarker cells comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the cell selection module and the solid-phase extraction module; controlling flow of blood through the isolation channels; isolating biomarker cells from blood; controlling flow of the processed liquid sample comprising the isolated biomarker cells through the solid-phase extraction module; lysing biomarker cells; and capturing DNA or RNA released from lysed biomarker cells.

The presently disclosed subject matter also describes a method of amplifying a nucleotide sequence comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the reaction module; controlling flow of the liquid sample through the reaction module; and amplifying a nucleotide sequence.

The presently disclosed subject matter also describes a method of sequencing a nucleotide sequence comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the nanosensor module; controlling flow of the liquid sample through the nanosensor module; detecting or identifying a single molecule or a nucleotide; and sequencing a nucleotide sequence by repeating said detecting or said identifying.

The presently disclosed subject matter also describes a method of sequencing a nucleotide sequence comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the hybridization sequencing module; controlling flow of the liquid sample through the diagnostic module; exposing a nucleotide sequence to probes; and detecting hybridized probes.

The presently disclosed subject matter also describes a method of sequencing a nucleotide sequence comprises providing a fluid-tight flow system described herein, wherein the non-transitory computer readable medium programmed to command the first pump of the first automated pipetting channel and the second pump of the second automated pipetting channel to control flow of the liquid sample through the microfluidic chip comprises programming to control flow of the liquid sample through the diagnostic module; controlling flow of the liquid sample through the diagnostic module; and detecting or identifying a single molecule or a nucleotide; sequencing a nucleotide sequence by repeating said detecting or identifying.

The presently disclosed subject matter also describes a method of detecting a chromosomal abnormality comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the diagnostic module; controlling flow of the liquid sample through the diagnostic module; and detecting a chromosomal abnormality.

The presently disclosed subject matter also describes a method of analyzing a protein comprises providing a fluid-tight flow system described herein wherein the non-transitory computer readable medium programmed to command the first pump of the first automated pipetting channel and the second pump of the second automated pipetting channel to control flow of the liquid sample through the microfluidic chip comprises programming to control flow of the liquid sample through the diagnostic module; controlling flow of the liquid sample through the diagnostic module; and analyzing a protein.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 2c is a top view of the base chip of the microfluidic chip according to embodiments of the present disclosure (cover plate not shown).

DETAILED DESCRIPTION OF EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention.

Figure 1A:
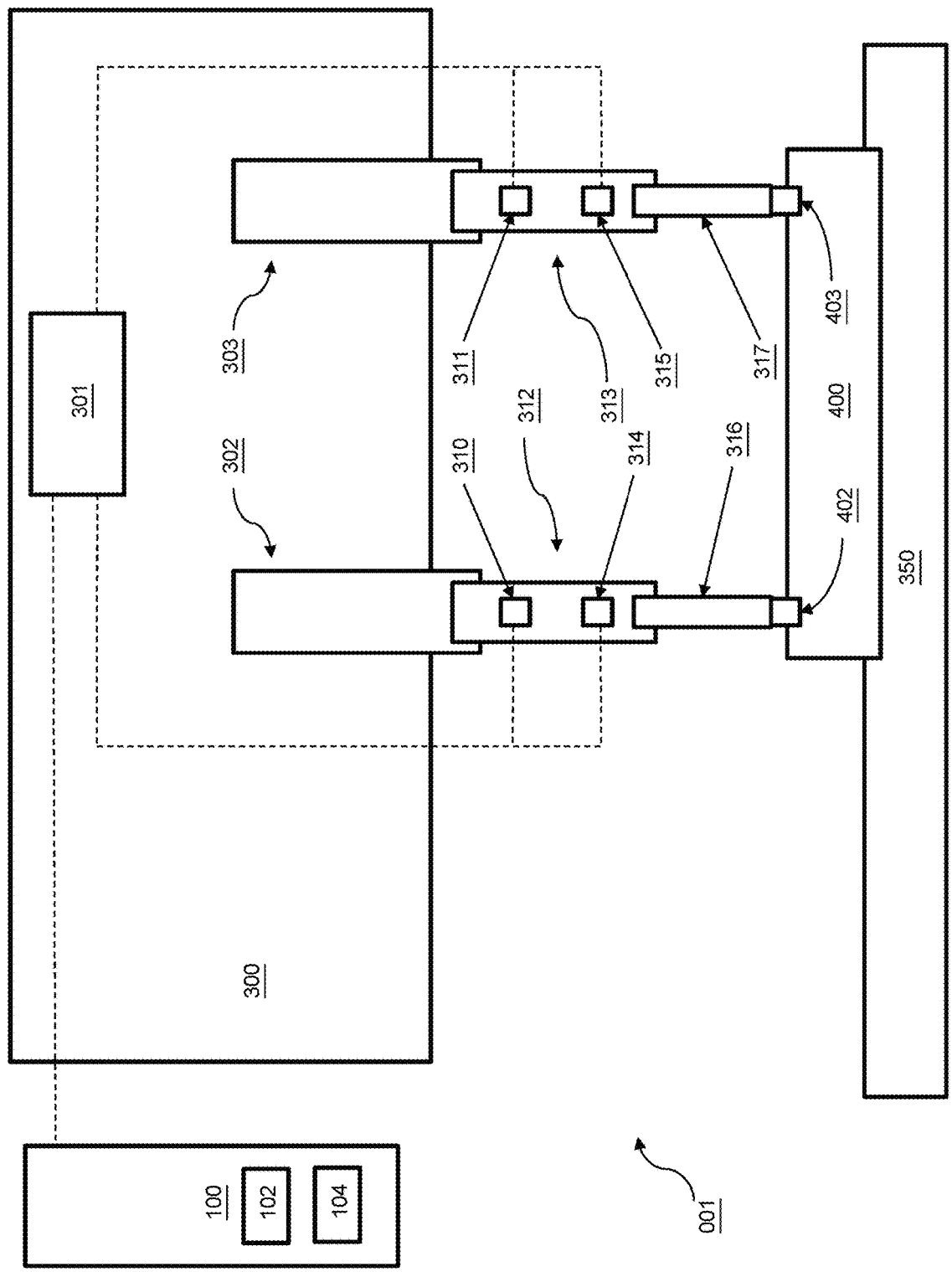
FIG. 1a is a schematic diagram of an example fluid-tight flow system according to embodiments of the present disclosure, and additional components of real-time feedback control according to embodiments of the present disclosure.
Figure 1B:
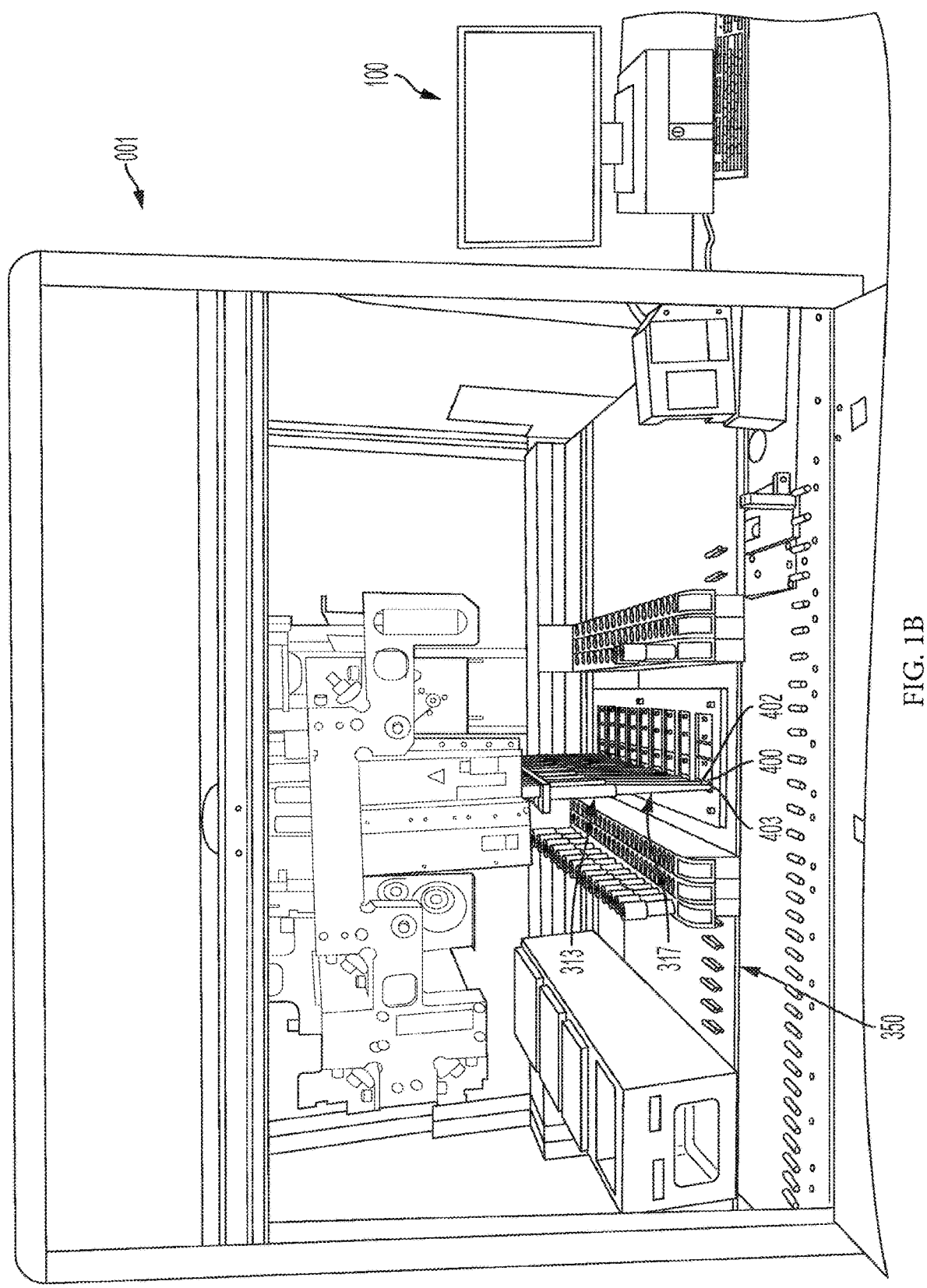
FIG. 1b illustrates an example fluid-tight flow system including a controller a pipetting instrument, e.g. an automated liquid handler, comprising multiple automated pipetting channels, multiple microfluidic chips each with an inlet port and outlet port, and an instrument deck to support the microfluidic chip, pipette tips, samples, reagents, workstations for sample processing.
Figure 1C:
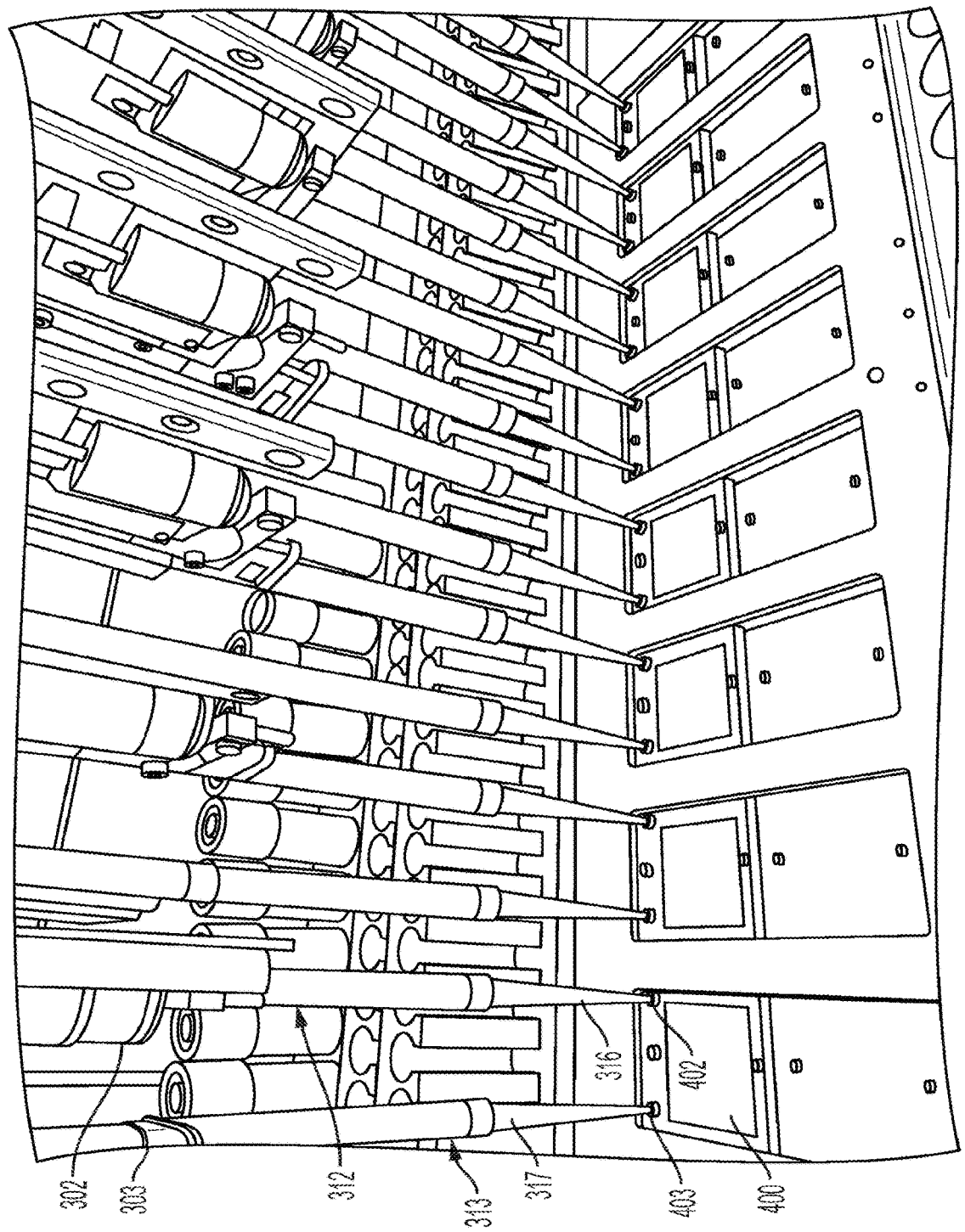
FIG. 1c is a perspective view of multiple pipetting channels and microfluidic chips, wherein the pipette tips are coupled to the inlet port and outlet port of the respective microfluidic chip, according to embodiments of the present disclosure.

The presently disclosed subject matter is now described in more detail. FIG. 1a is a schematic diagram of an example fluid-tight flow system according to embodiments of the present disclosure, and additional components of real-time feedback control according to embodiments of the present disclosure. FIG. 1a illustrates an example fluid-tight flow system including a controller 100, a pipetting instrument 001 comprising two automated pipetting channels 312 and 313, and a microfluidic chip 400. The microfluidic chip 400 comprises an inlet port 402, an outlet port 403, and a capture bed 406 (shown in FIG. 2c). FIG. 1b illustrates an example fluid-tight flow system including a controller 100, e.g. embodied in a computer; a pipetting instrument 001, e.g. an automated liquid handler, comprising multiple automated pipetting channels, e.g. 312 and 313; multiple microfluidic chips, e.g. 400, each with an inlet port and outlet port, e.g. 402 and 403, respectively; and an instrument deck 350 to support the microfluidic chip 400, pipette tips, samples, reagents, workstations for sample processing. FIG. 1c is a perspective view of multiple pipetting channels, e.g. 312 and 313, and microfluidic chips, e.g. 400, wherein the pipette tips, e.g. 316 and 317, are coupled to the inlet port, e.g. 402, and outlet port, e.g. 403, of the respective microfluidic chip, e.g. 400, according to embodiments of the present disclosure.

A first automated pipetting channel 312 comprises a pump 308 (shown in FIG. 2a) and a pipette tip 316 that contains a liquid sample (not shown) and is coupled to the inlet port 402. A second automated pipetting channel 313 comprises a pump 309 (shown in FIG. 2a) and a pipette tip 317 that is coupled to the outlet port 403. In one embodiment, the pipette tips 316 and 317 are simultaneously coupled to the inlet port 402 and the outlet port 403, respectively. In one embodiment, the pipette tips 316 and 317 are disposable pipette tips. The two automated pipetting channels 312 and 313 are configured and operative to control fluid flow of a liquid sample from the pipette tip 316 and through the microfluidic chip 400 via the inlet port 402, capture bed 406 (show in FIG. 2c), and outlet port 403. The liquid sample may flow through the microfluidic chip into the pipette tip 317 of the second automated pipette 313 or a sample container (not shown).

The pipetting instrument 001 may be an automated liquid handling system such as Biomek™ FX from Beckman-Coulter, Inc. (Brea, Calif.), Freedom EVO™ from Tecan Group, Ltd. (Switzerland), and STAR Line™ from Hamilton Company (Reno, Nev.). In one embodiment, the pipetting instrument 001 comprises an instrument motherboard 301 that is in communication with a controller 100, instrument motors (e.g. pipettor arm drive motors such as X- and Y-drive motors; pipetting channel Z-drive motor; and pipetting drive motors 310, and 311), and instrument sensors (e.g. pressure sensors 315 and 315, tip sensors, capacitive sensors). The instrument motherboard 301 comprises a communication device, a processing device, and a memory device for storing programs that control the functions of various pipetting instrument 001 components. The pipetting instrument 001 may further comprise an instrument deck 350 to support the microfluidic chip 400, pipette tips, samples, reagents, workstations for sample processing.

The controller 100 is in communication with the instrument motherboard 301, instrument motors (e.g. pipettor arm drive motors such as X- and Y-drive motors; pipetting channel Z-drive motor; and pipetting drive motors 310, and 311), and instrument sensors (e.g. pressure sensors 315 and 315, tip sensors, capacitive sensors). In one embodiment, the controller 100 is integrated into the pipetting instrument 001 or with the instrument motherboard 301. The controller 100 generally comprises a communication device, a processing device, and a memory device. The processing device is operatively coupled to the communication device and memory device. The processing device uses the communication device to communicate with the instrument motherboard 301, and as such the communication device generally comprises a modem, server, or other device for communicating with the instrument motherboard 301. The controller 100 may comprises a non-transitory computer readable medium, stored in the memory device, and programmed to command the first pump of the first automated pipetting channel and the second pump of the second automated pipetting channel to control flow of the liquid sample through the microfluidic chip. The controller 100 may be embodied in one or more computers, microprocessors or microcomputers, microcontrollers, programmable logic controllers, field programmable gate arrays, or other suitably configurable or programmable hardware components. The controller 100 may comprise control software, firmware, hardware or other programming instruction sets programmed to receive user inputs, and control instrument motors (e.g. pipettor arm drive motors such as X- and Y-drive motors; pipetting channel Z-drive motor; and pipetting drive motors 310, and 311); as well as provide for real-time feedback control according to embodiments of the present disclosure.

The controller 100 may comprise a non-transitory computer readable medium, stored in the memory device, and programmed to receive data from the first pressure sensor in real-time and data from the second pressure sensor in real-time, and adjust command of at least the first pump of the first automated pipetting channel or the second pump of the second automated pipetting channel to adjust a flow rate within the microfluidic chip using real-time feedback based on said data from the first pressure sensor and second pressure sensor. The controller 100 may comprise control software, firmware, hardware or other programming instruction sets programmed to receive data from instrument sensors (e.g. pressure sensors 314 and 315), receive user inputs, conduct analyses based on pressure data, and adjust control of the pump(s) of the automated pipetting channel(s).

The controller 100 may control parameters of the pipetting instrument 001 such as, timing of movement and X, Y, Z positions of instrument arms 302 and 303, timing and control of pipetting drive motors 310 and 311 such as to control fluid flow rates of a liquid sample through a microfluidic chip. The controller 100 can transmit control signals or other instructions to electrical or electromechanical system components (e.g. such as motors or drives, servos, actuators, racks and pinions, gearing mechanisms, and other interconnected or engaging dynamic parts) via communication technologies to enable data communication (e.g. serial or Ethernet connections, Universal Serial Bus (USB), Institute of Electrical and Electronics Engineers (IEEE) Standard 1394 (i.e., "FireWire") connections, wireless data communications technologies such as BLUETOOTH™ or other forms based upon infrared (IR) or radio frequency (RF) signals.

Figure 2A:
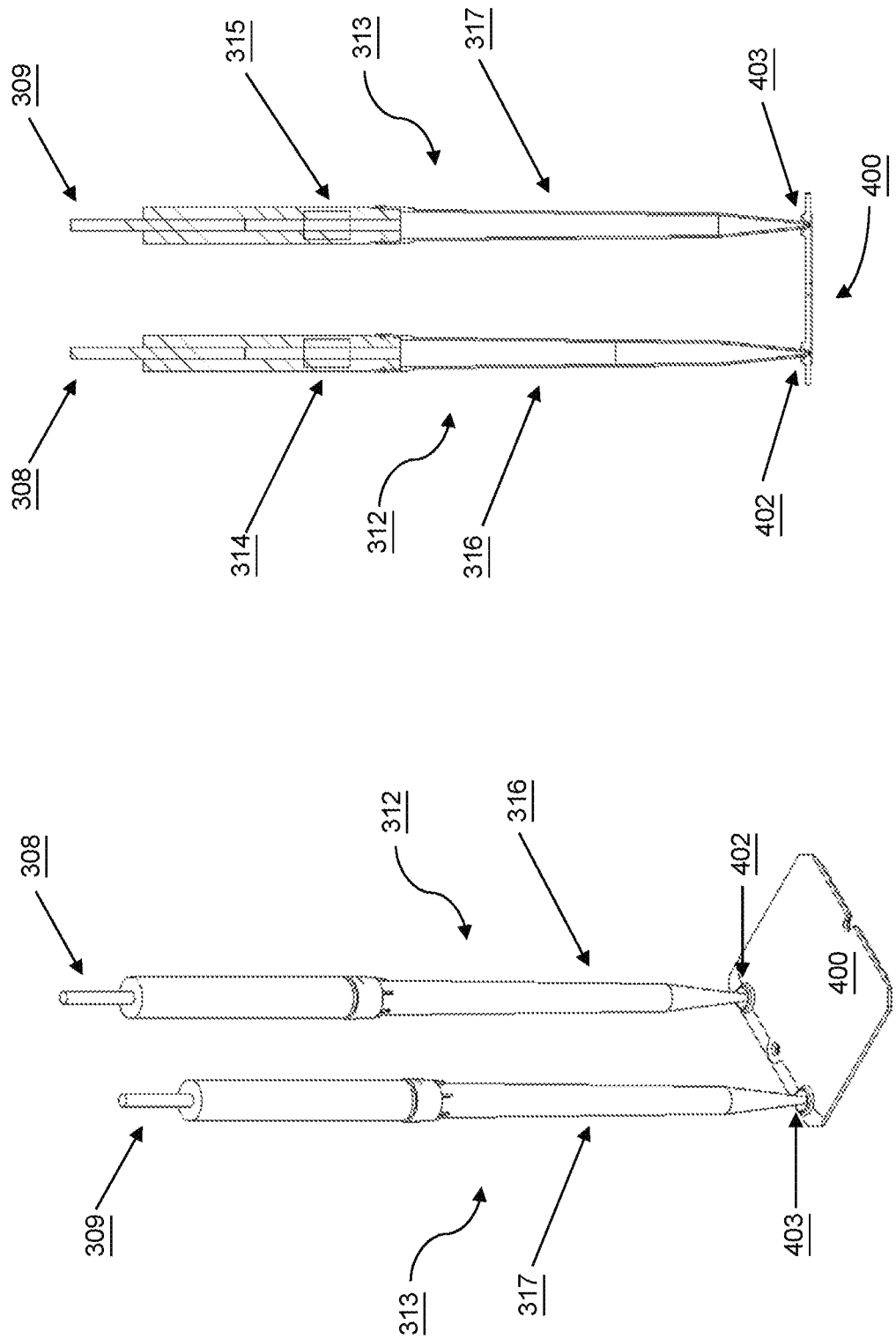
FIG. 2a, on the left, is a perspective view of the pipetting channels and microfluidic chip, wherein the pipette tips are coupled to the inlet port and outlet port of the microfluidic chip, respectively, according to embodiments of the present disclosure; and on the right, is a vertical sectional view of the same according to embodiments of the present disclosure.

FIG. 2a, on the left, is a perspective view of the pipetting channels 312 and 313 and microfluidic chip 400, wherein the pipette tips 316 and 317 are coupled to the inlet port 402 and outlet port 403 of the microfluidic chip 400, respectively, according to embodiments of the present disclosure; and on the right, is a vertical sectional view of the same according to embodiments of the present disclosure. Accordingly, the pipetting channels 312 and 313 comprising the pipette tips 316 and 317, respectively, are in fluid communication with the channels of the microfluidic chip. The pipette tips 316 and 317 are coupled to the inlet port 402 and outlet port 403 of the microfluidic chip 400 via a friction fit, thereby creating a hermetic (or air-tight) seal and a leak-tight seal. As used herein, "fluid-tight" means air-tight and leak-tight. In one embodiment, the pumps of the automated pipetting channels are pistons or plungers 308 and 309 in communication with pipetting drive motors 310 and 311 and pressure sensors 314 and 315. In one embodiment, the pressure sensors 314 and 315 are integrated into the pipetting channels 312 and 313.

Figure 2B:
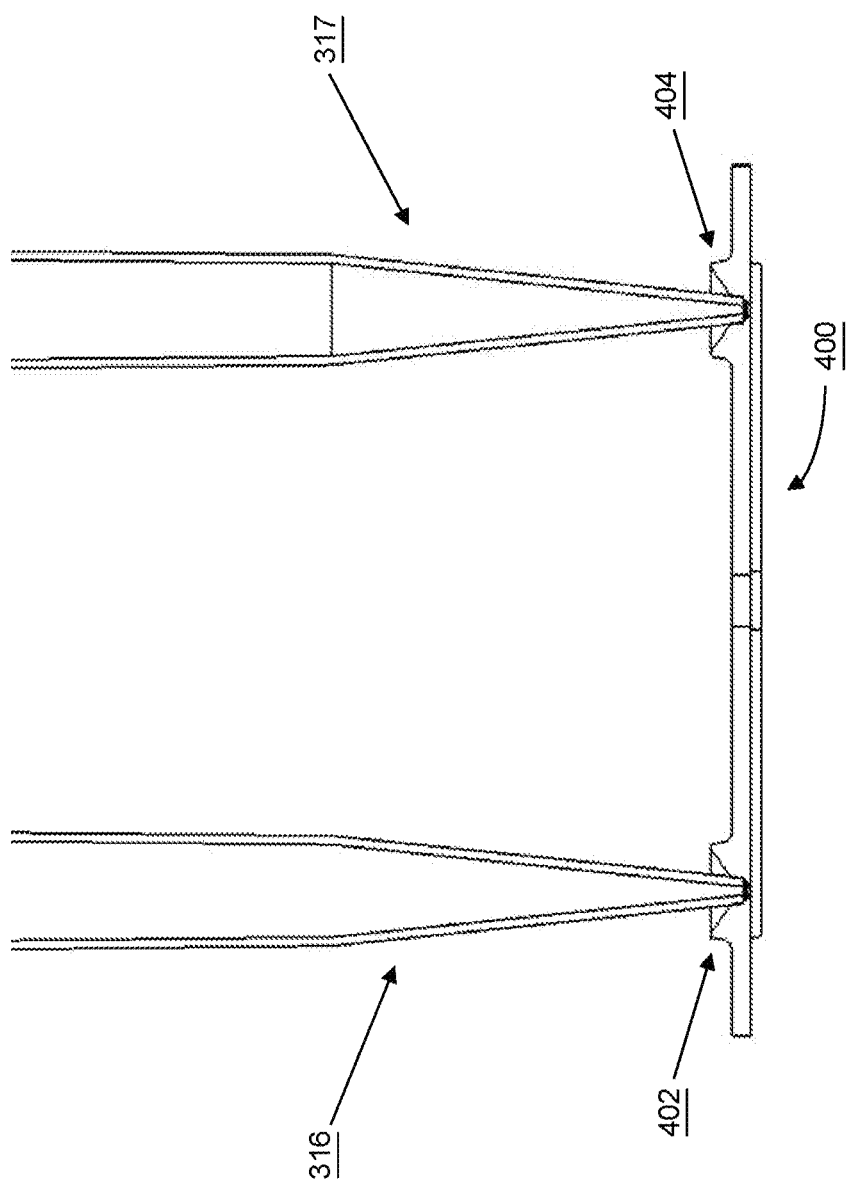
FIG. 2b is a cross sectional view of the pipette tips coupled to the inlet port and outlet port of the microfluidic chip, respectively, according to embodiments of the present disclosure.

FIG. 2b is a cross sectional view of the pipette tips 316 and 317 coupled to the inlet port 402 and outlet port 403 of the microfluidic chip 400, respectively, according to embodiments of the present disclosure. In one embodiment, the inlet port 402 or outlet port 403 has a tapered shape. In one embodiment, the inlet port 402 and outlet port 403 have a tapered shape and are thus configured to receive and couple to pipette tips are varying sizes.

FIG. 2c is a top view of the base chip of the microfluidic chip according to embodiments of the present disclosure (cover plate not shown). The microfluidic chip 400 comprises an inlet port 402, a feeder channel 408, a capture bed 406, an exit channel 408, and an outlet port 403; wherein the capture bed 406 comprises a plurality of isolation channels 406a, the feeder channel intersects with the isolation channels, and the exit channel intersects with the isolation channels. In one embodiment, the capture bed comprises a plurality of isolation channels configured to isolate circulating tumor cells, circulating leukemic cells, cfDNA, or exosomes.

Figure 3:
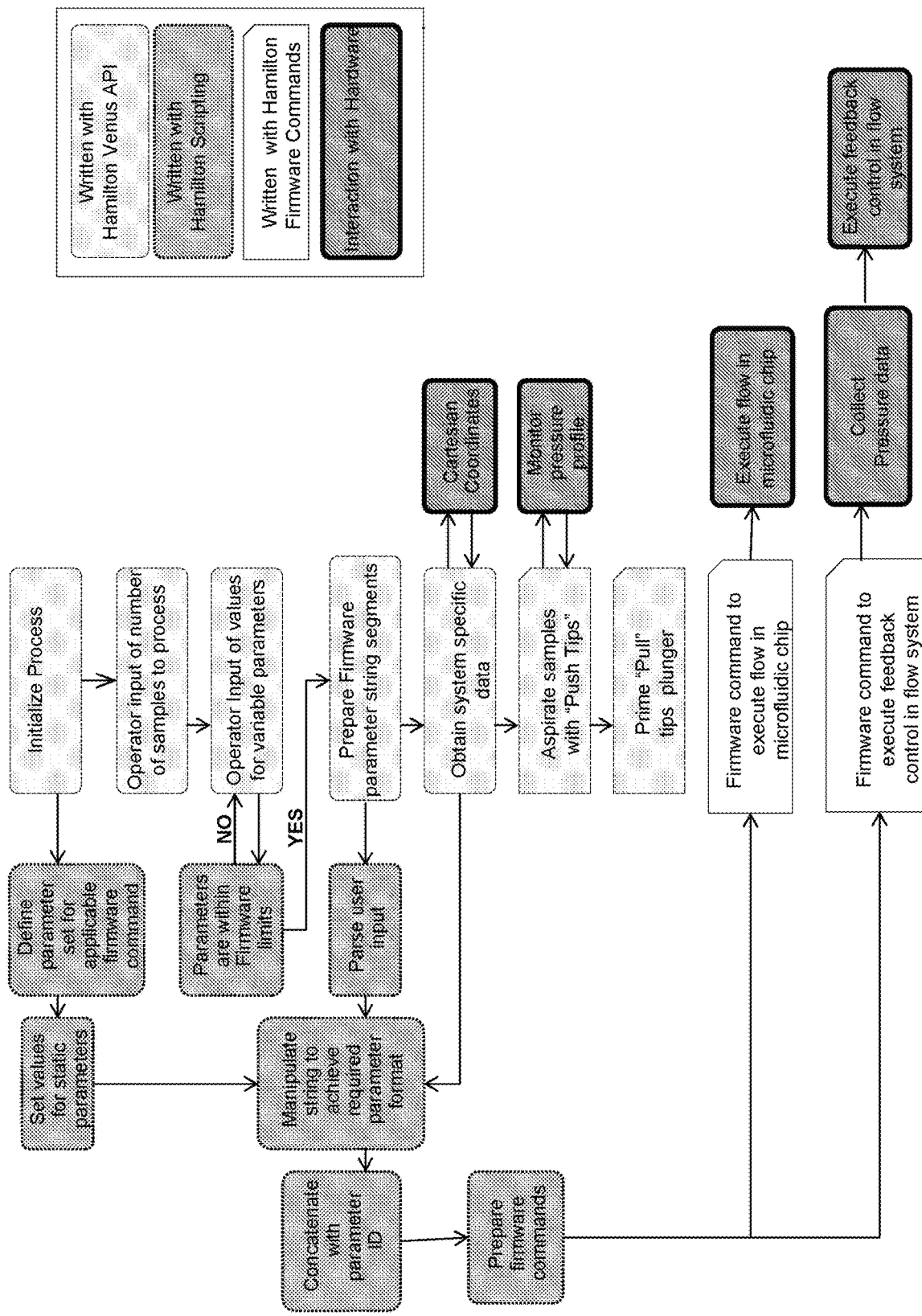
FIG. 3 is the backend software architecture for preparing firmware commands of a Hamilton Microlab STAR line liquid handler according to one embodiment of the present disclosure.

FIG. 3 is the backend software architecture for preparing firmware commands of a Hamilton Microlab STAR line liquid handler according to one embodiment of the present disclosure.

Figure 4A:
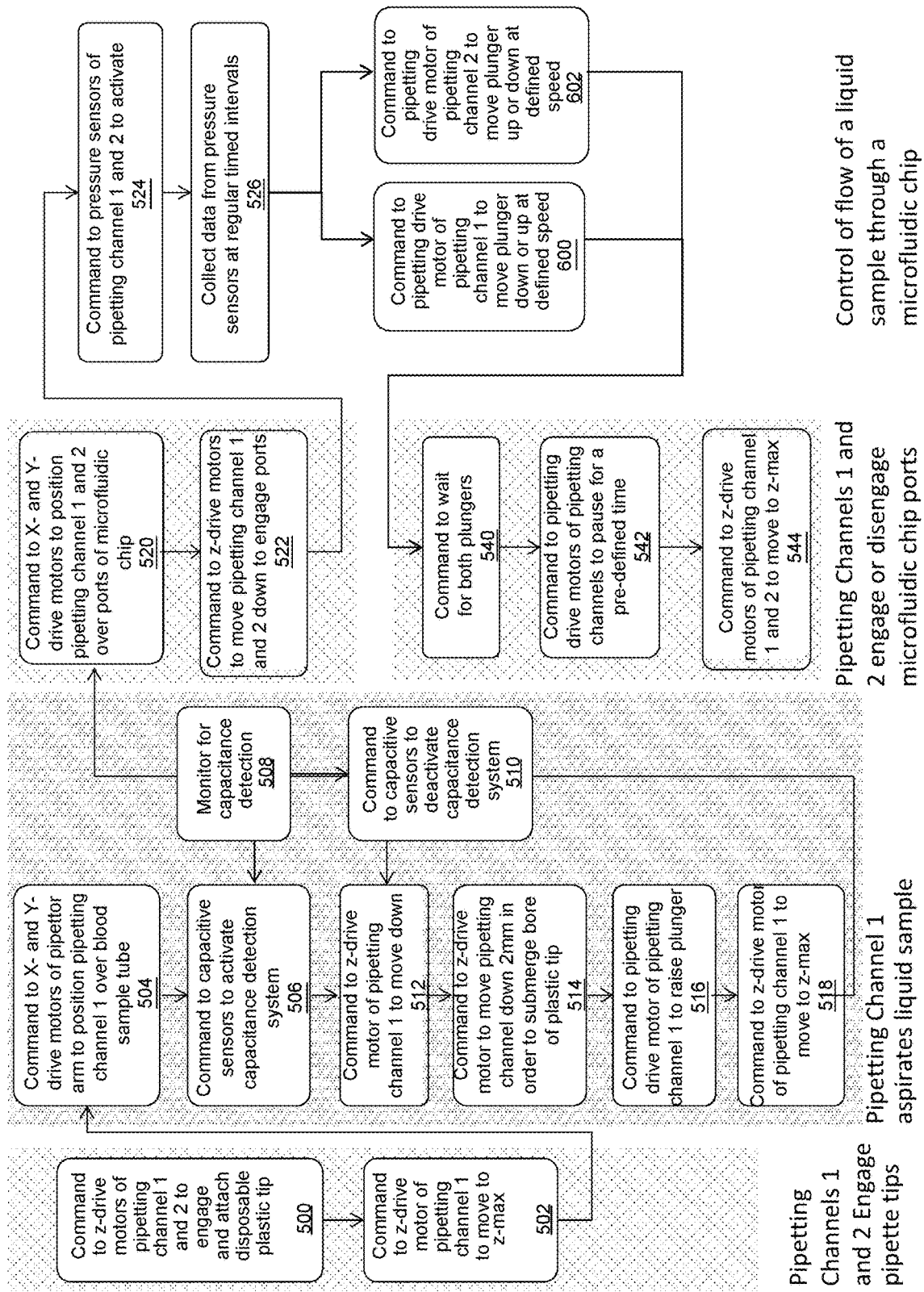
FIG. 4a is a flow chart including exemplary methods according to embodiments of the present invention.
Figure 4B:
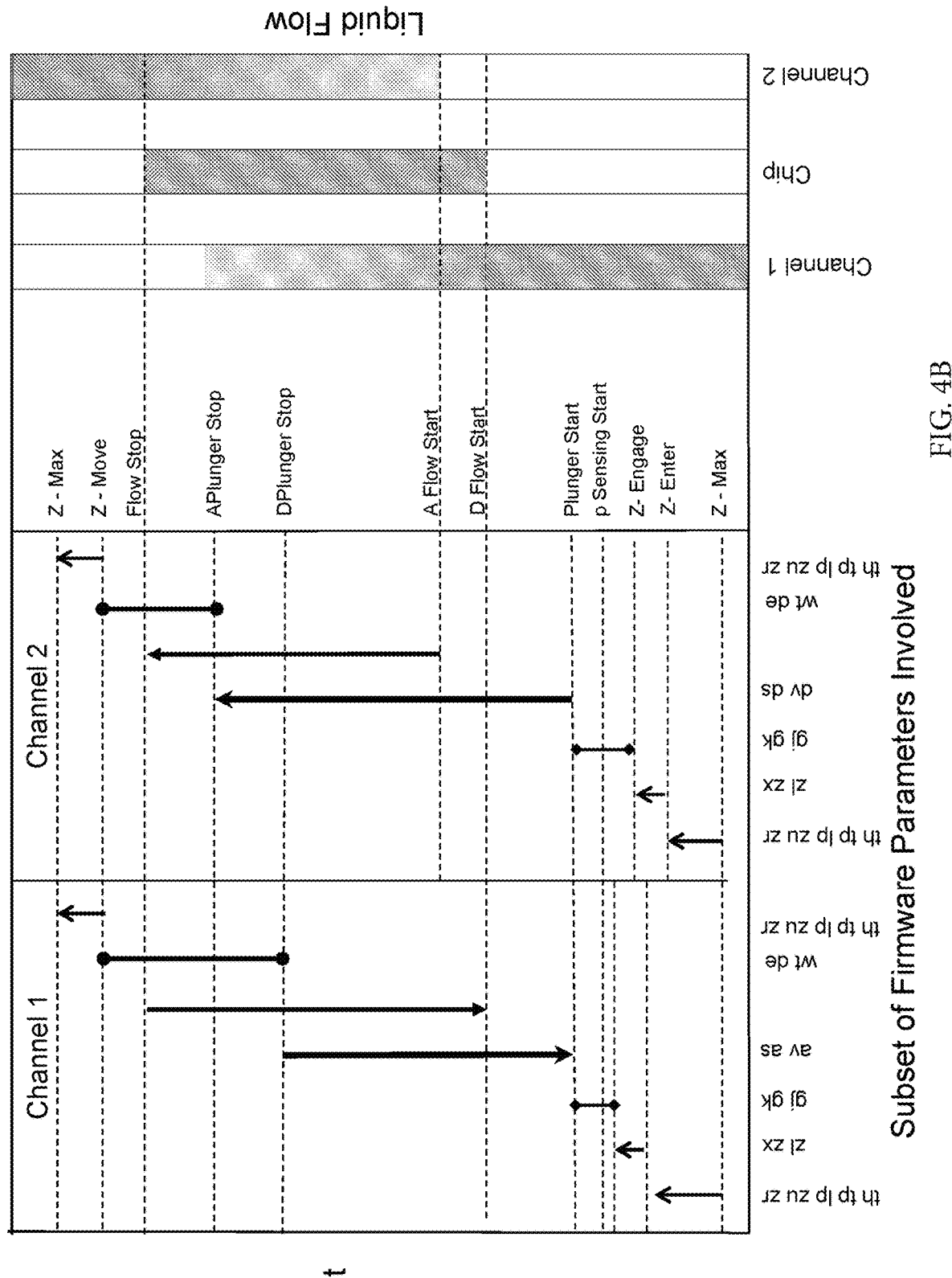
FIG. 4b is an exemplary schematic of coordinating commands and firmware parameters to control z-drive motors and pipetting drive motors of pipetting channels 1 and 2 according to embodiments of the present invention.

FIG. 4a is a flow chart including exemplary methods according to embodiments of the present invention. The method may be implemented by controller 100 in communication with other components of the presently disclosed system; for example, by sending commands and receiving data via the instrument motherboard 301, which is in communication with instrument motors or instrument sensors. In accordance with some embodiments, a computer readable medium may be encoded with data and instructions for controlling flow of a liquid sample through a microfluidic chip; such as data and instructions to: command the X- and Y-drive motors of the pipetting arm to position pipetting channel 1 and 2, each comprising a pipette tip, over the inlet and outlet ports of a microfluidic chip (step 520), command the z-drive motors to move pipetting channel 1 and 2 down to engage the pipette tips with the inlet and outlet ports of the microfluidic chip, respectively (step 522), command pressure sensors of pipetting channels 1 and 2 to activate (step 524), collect data from pressure sensors, preferably at regular time intervals (step 526), and command a) pipetting drive motor of pipetting channel 1 to move plunger down or up at a defined speed (step 600) and b) pipetting drive motor of pipetting channel 2 to move plunger up or down at a defined speed (step 602) and coordinate these commands to control flow of a liquid sample through a microfluidic chip and into the pipette tip of pipetting channel 2, and command the z-drive motors of the pipetting channels to move to z-max (step 544). The command to a pipetting drive motor of a pipetting channel to move plunger down or up at a defined speed includes a defined speed of zero to stop the movement of the plunger. FIG. 4b is an exemplary schematic of coordinating commands and firmware parameters to control z-drive motors and pipetting drive motors of pipetting channels 1 and 2 to control flow from the pipette tip of pipetting channel 1, through a microfluidic chip, and into the pipette tip of pipetting channel 2, according to embodiments of the present invention.

The systems and methods disclosed herein are novel and have unique advantages in the isolation of rare biomarkers. First, the fluid-tight flow system reduces the loss of biomaterial by using automated pipetting channels comprising pipette tips coupled to the inlet and outlet ports of a microfluidic chip, removing extraneous components such as capillary connectors and directly introducing a liquid sample into a microfluidic chip for isolation. Second, the automated pipetting channels comprising pipette tips coupled to the inlet and outlet ports of a microfluidic chip creates a fluid-tight flow system that enables coordinated use of the pipetting channels in novel way to control flow of a liquid sample from one pipette tip, through a microfluidic chip, and into the other pipette tip to collect the liquid sample. Typically, pistons or plungers of automated pipetting channels are configured to aspirate or dispense when the pipette tip is in contact with a liquid sample. The fluid-tight flow system described herein enables use of the pipetting channels as synchronized pumps to control flow of a liquid sample through a microfluidic chip, including use of a pipetting channel to aspirate or pull a liquid sample that is not in contact with the pipette tip or dispense or push a liquid sample that is no longer in contact with the pipette tip (i.e. when the liquid sample has completely entered the microfluidic chip). Third, the systems and methods disclosed herein enable control of flow rates at low to extremely low flow rates through microfluidic chips; thus, providing advantages in capture and isolation of rare biomarkers (e.g. DNA, RNA, exosomes).

Figure 4C:
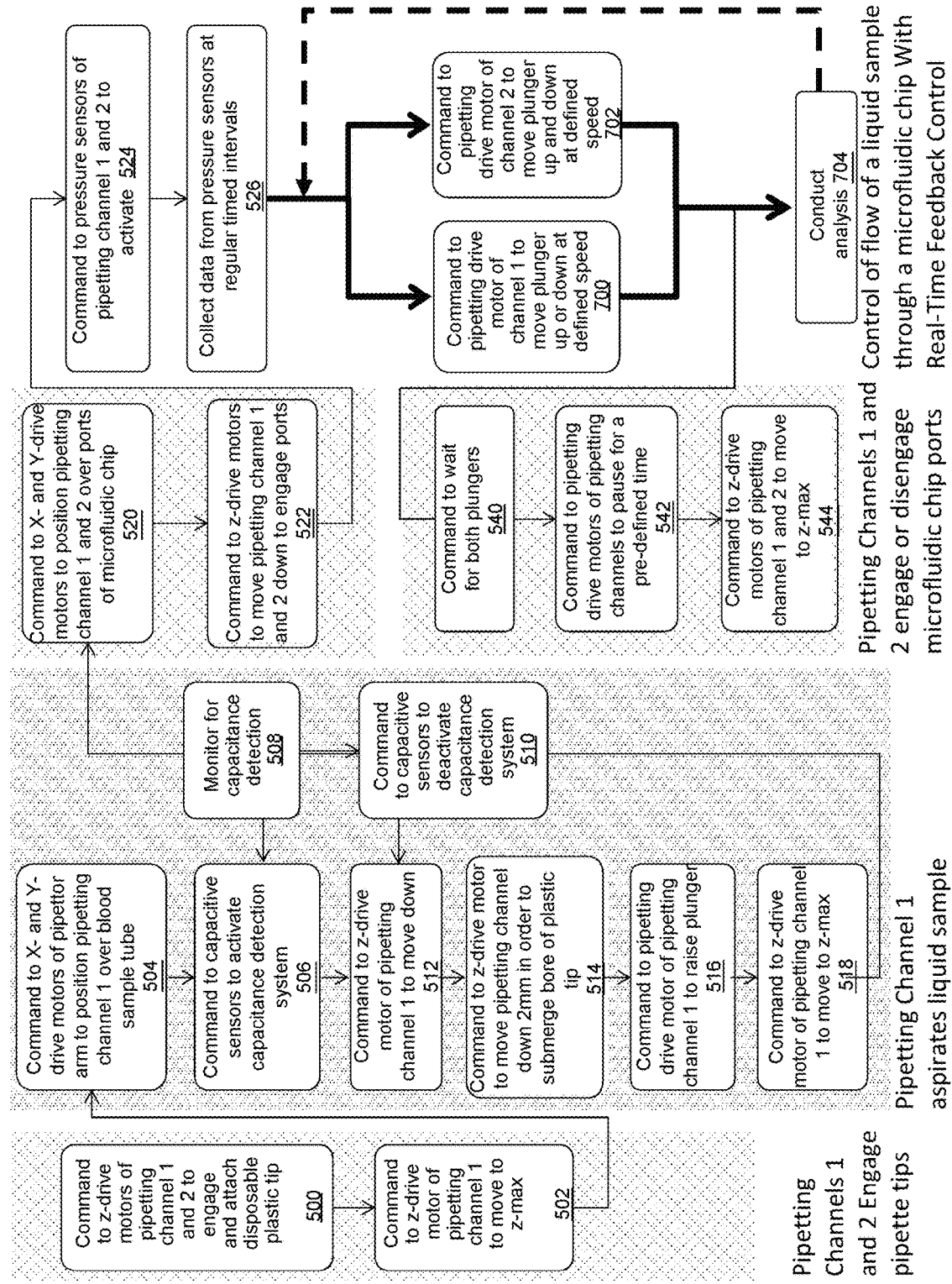
FIG. 4c is a flow chart including exemplary methods according to embodiments of the present invention.

FIG. 4c is a flow chart including exemplary methods according to embodiments of the present invention. The method may be implemented by controller 100 in communication with other components of the presently disclosed system; for example, by sending commands and receiving data via the instrument motherboard 301, which is in communication with instrument motors or instrument sensors. In accordance with some embodiments, a computer readable medium may be encoded with data and instructions for controlling flow of a liquid sample through a microfluidic chip; such as data and instructions to: command the X- and Y-drive motors of the pipetting arm to position pipetting channel 1 and 2, each comprising a pipette tip, over the inlet and outlet ports of a microfluidic chip (step 520), command the z-drive motors to move pipetting channel 1 and 2 down to engage the pipette tips with the inlet and outlet ports of the microfluidic chip, respectively (step 522), command pressure sensors of pipetting channels 1 and 2 to activate (step 524), collect data from pressure sensors, preferably at regular time intervals (step 526), command a) pipetting drive motor of pipetting channel 1 to move plunger down or up at a defined speed (step 700) and b) pipetting drive motor of pipetting channel 2 to move plunger up or down at a defined speed (step 702) and coordinate these commands to control flow of a liquid sample through a microfluidic chip (and ultimately into the pipette tip of pipetting channel 2), conduct analysis on the data from the pressure sensors (step 704) and adjust commands (represented by dotted line) in steps 700 and 702, and command the z-drive motors of the pipetting channels to move to z-max (step 544). The command to a pipetting drive motor of a pipetting channel to move plunger down or up at a defined speed includes a defined speed of zero to stop the movement of the plunger.

Typically, a pressure sensor monitors pressure in the air space between a liquid sample and a plunger in a pipetting channel. Accordingly, any real-time feedback in current liquid handling pipetting systems with pressure sensors (e.g. Dynamic Device real-time closed loop pipetting systems) is limited to detection of errors related to functions of a pipette tip (e.g. clogging in a pipette tip, flow rate of aspirating into a pipette tip, flow rate of dispensing from a pipette tip, volumetric monitoring of liquid dispensed or aspirated) apart from any fluidic system and thus requiring separate pressure sensors to monitor pressure in a fluidic system. Pressure data and movement of the plunger can be correlated to calculate a standard curve (pressure v. time) representing aspirating a liquid sample into a pipette tip or dispensing a liquid sample from a pipette tip. For example, when the pipette tip is in contact with a sample liquid and as the piston or plunger moves up, air pressure in the tip is lowered and a liquid sample is pushed into a pipette tip by the atmospheric pressure. Deviations from this standard curve can detect errors related to functions of pipette tip, such as a clogged tip during aspiration based on a pressure threshold for clots and incomplete aspiration of a liquid sample into a pipette tip based on a pressure threshold for insufficient liquid in a pipette tip.

The systems and methods including real-time feedback control and disclosed herein are novel and have unique advantages in controlling flow in a microfluidic chip. The automated pipetting channels comprising pressure sensors and pipette tips coupled to the inlet and outlet ports of a microfluidic chip creates a fluid-tight flow system that enables monitoring pressure in a fluidic system and determining flow rate without additional sensor components, and adjusting flow rate with real-time feedback controls. Real-time feedback based on pressure data in the systems disclosed herein comprises detection of clogging in the microfluidic chip, detection of a pressure level at or above a pressure threshold to avoid over-pressure in a microfluidic chip, and detection of flow rate at or above a flow rate threshold for a liquid sample.

Figure 4D:
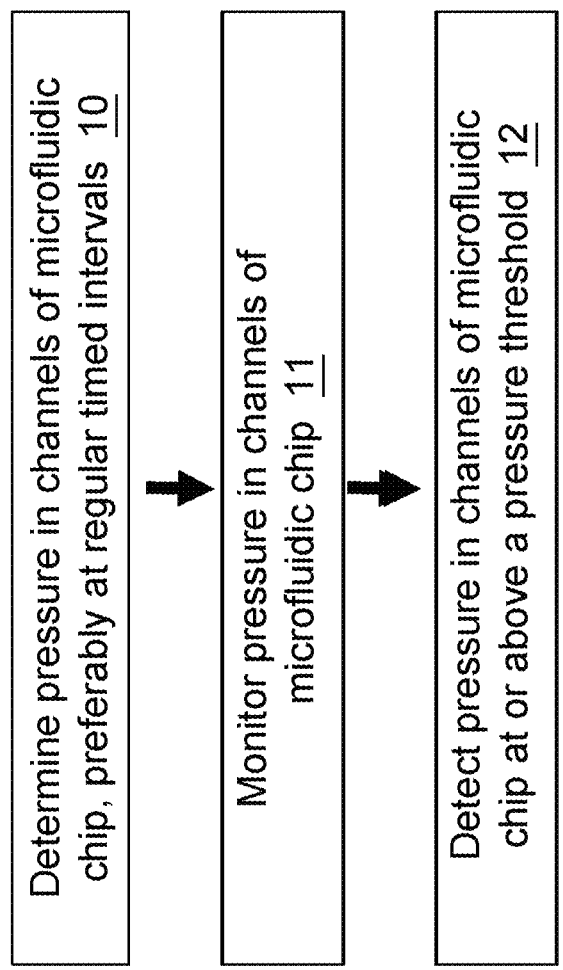
FIG. 4d is a flow chart including exemplary methods for conducting analysis on the data from the pressure sensors according to embodiments of the present invention.
Figure 4E:
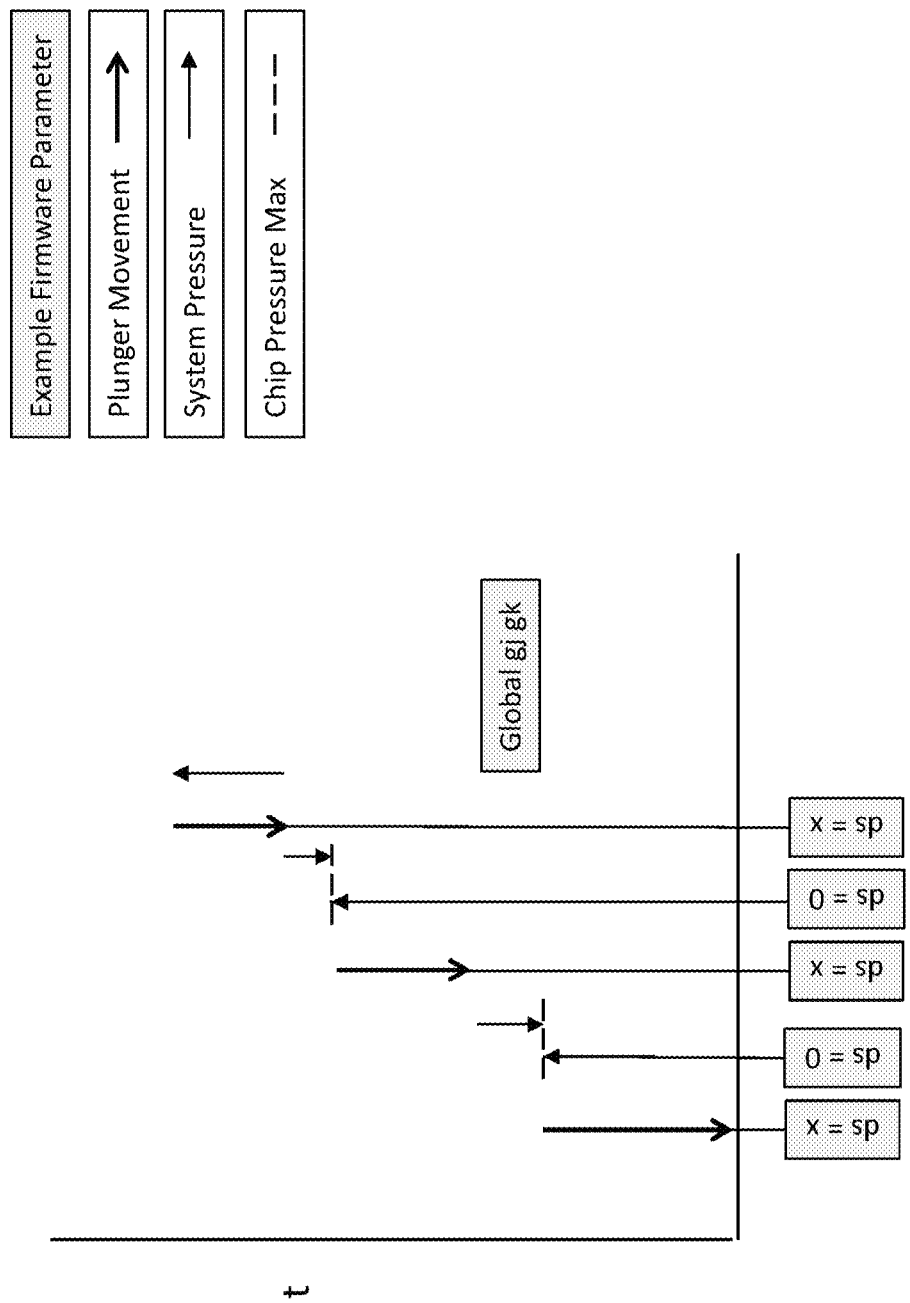
FIG. 4e is a chart of exemplary real-time feedback control parameters to avoid over-pressure in a microfluidic chip according to embodiments of the present invention.

FIG. 4d is a flow chart including exemplary methods for conducting analysis on the data from the pressure sensors according to embodiments of the present invention. As shown in FIG. 4d, the step of conducting analysis on the data from the pressure sensors (step 704) can include the following steps, and a computer readable medium may further be encoded with data and instructions to: determine pressure in the channels of a microfluidic chip, preferably at regular timed intervals (step 10), monitor pressure in channels of a microfluidic chip (step 11), and detect pressure in the channels of a microfluidic chip at, above, or below a pressure threshold (step 12). A pressure threshold that correlates to detection of clogging in a microfluidic chip can be determined by 1) comparison between a standard curve (pressure v. time), based on pressure data and movement of the plunger(s), that represents successful flow of a liquid sample through a microfluidic chip and a curve (pressure v. time), based on pressure data and movement of the plunger(s), that represents clogging in a microfluidic chip and 2) selection of a pressure level as a pressure threshold. A pressure threshold that correlates to maximum pressure in a microfluidic chip can be determined by 1) comparison between a standard curve (pressure v. time), based on pressure data and movement of the plunger(s), that represents successful flow of a liquid sample through a microfluidic chip and a curve (pressure v. time), based on pressure data and movement of the plunger(s), that represents reaching maximum pressure in a microfluidic chip and 2) selection of a pressure level as a pressure threshold, e.g. to avoid over-pressure in a microfluidic chip. A computer readable medium may further be encoded with data and instructions to receive user input of a pressure threshold, or to determine any of the foregoing pressure thresholds.

A computer readable medium may further be encoded with data and instructions to repeat adjustments in commands in steps 700 and 702 and analysis (step 704) in order to control flow of a liquid sample through a microfluidic chip with real-time feedback. FIG. 4c is a chart of exemplary real-time feedback control parameters to avoid over-pressure in a microfluidic chip according to embodiments of the present invention. As shown schematically in this chart, steps 10-12 (with respect to a pressure threshold that correlates to maximum pressure in a microfluidic chip), 700, and 702 are repeated over time as fluid flow through a microfluidic chip is adjusted. Pressure thresholds to avoid over-pressure in a microfluidic chip may be defined by user, or a computer readable medium may further be encoded with data and instructions to determine a pressure threshold to avoid over-pressure in a microfluidic chip.

Figure 4F:
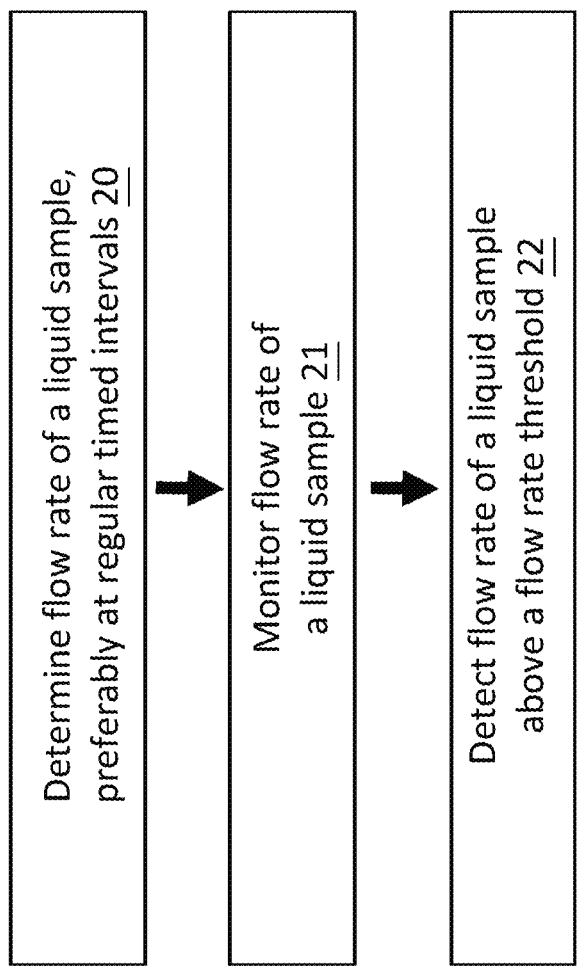
FIG. 4f is a flow chart including exemplary methods for conducting analysis on the data from the pressure sensors according to embodiments of the present invention.

FIG. 4f is a flow chart including exemplary methods for conducting analysis on the data from the pressure sensors according to embodiments of the present invention. As shown in FIG. 4f, the step of conducting analysis on the data from the pressure sensors (step 704) can include the following steps, and a computer readable medium may further be encoded with data and instructions to: determine flow rate of a liquid sample in the channels of a microfluidic chip, preferably at regular timed intervals (step 20), monitor the flow rate of a liquid sample in channels of a microfluidic chip (step 21), and detect a flow rate in the channels of a microfluidic chip at, above, or below a flow rate threshold (step 22). A flow rate threshold that correlates to optimized flow to isolate a given biomarker can be determined by 1) comparison between a standard curve (flow rate v. time), based on pressure data and movement of the plunger(s), that represents successful flow of a liquid sample through a microfluidic chip and a curve (flow rate v. time), based on pressure data and movement of the plunger(s), that represents an optimized flow rate for a class of liquid samples through a microfluidic chip and 2) selection of a flow rate as a flow rate threshold. A computer readable medium may further be encoded with data and instructions to receive user input of a flow rate threshold, or to determine a flow rate threshold. A computer readable medium may further be encoded with data and instructions to repeat adjustments in commands in steps 700 and 702 and analysis (step 704) in order to control flow of a liquid sample through a microfluidic chip with real-time feedback.

As shown in FIG. 1a, the controller 100 comprises a decision engine 102 and a flow control rules server 104. As described herein, a computer readable medium may be encoded with data and instructions to command a) pipetting drive motor of pipetting channel 1 to move plunger down or up at a defined speed (step 700) and b) pipetting drive motor of pipetting channel 2 to move plunger up or down at a defined speed (step 702) and coordinate these commands to control flow of a liquid sample through a microfluidic chip (and ultimately into the pipette tip of pipetting channel 2). The flow control rules server 104 comprises rules for coordinating commands to the pipetting drive motors of the pipetting channels to control flow of a liquid sample through a microfluidic chip. Exemplary rules are set forth in Table 1:

| Flow Control options | Command to pipetting drive motor of Pipetting Channel 1 comprising pipette tip coupled to inlet port | Command to pipetting drive motor of Pipetting Channel 2 comprising pipette tip coupled to outlet port |
|---|---|---|
| Start flow | Move plunger down | Move plunger up |
| Start flow | Move plunger down | No movement of plunger |

| Flow Control options | Command to pipetting drive motor of Pipetting Channel 1 comprising pipette tip coupled to inlet port | Command to pipetting drive motor of Pipetting Channel 2 comprising pipette tip coupled to outlet port |
|---|---|---|
| Start flow | No movement of plunger | Move plunger up |
| Decrease flow rate | Move plunger down at decreased speed | No change in movement |
| Decrease flow rate | No change in movement | Move plunger up at decrease speed |
| Decrease flow rate | No change in movement | Move plunger down |
| Decrease flow rate | Move plunger down at decreased speed | Move plunger up at decreased speed |
| Increase flow rate | Move plunger down at increased speed | No change in movement |
| Increase flow rate | No change in movement | Move plunger up at increased speed |
| Increase flow rate | Move plunger down at increased speed | Move plunger up at increased speed |
| Stop flow | Stop movement of plunger | Stop movement of plunger |
| Stop flow | Move plunger down | Move plunger down |
| Reverse flow | Move plunger in opposite direction relative to previous movement | Move plunger in opposite direction relative to previous movement |

The flow control rules server 104 may comprise rules for determining a pressure threshold. The flow control rules server 104 may comprise rules for determining a flow rate threshold. The decision engine 102 is configured to determine which rules of the flow control rules server to apply to coordinate commands to the the pipetting drive motors of the pipetting channels to control flow of a liquid sample through a microfluidic chip. In one embodiment, the decision engine 102 is configured to determine which rules of the flow control rules server to apply in response to detection of pressure at, above, or below a pressure threshold. In one embodiment, the decision engine 102 is configured to determine which rules of the flow control rules server to apply in response to detection of a flow rate at, above, or below a flow rate threshold.

The various techniques described herein may be implemented with hardware or software or, where appropriate, with a combination of both. For example, the controller device 100 shown in FIG. 1a may include suitable hardware, software, or combinations thereof configured to implement the various techniques described herein. The methods and system of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and components of the system may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method of isolating biomarker cells from a liquid sample comprising:
   a) providing a fluid-tight flow system comprising:
      a microfluidic chip comprising an inlet port in fluid communication with an outlet port and a cell selection module, wherein said cell selection module comprises a capture bed in fluid communication with the inlet port and the outlet port, and wherein the capture bed comprises a plurality of isolation channels configured to isolate biomarker cells from the liquid sample or solid supports configured to bind to biomarker cells;
      a first automated pipetting channel comprising a first pump, and a first pipette tip containing a liquid sample and coupled to the inlet port;
      a second automated pipetting channel comprising a second pump, and a second pipette tip coupled to the outlet port; and
      a non-transitory computer readable medium in communication with the first pump and the second pump, and programmed to command the first pump of the first automated pipetting channel and the second pump of the second automated pipetting channel to control flow of the liquid sample through the microfluidic chip, wherein the non-transitory computer readable medium comprises programming to control flow of the liquid sample through the cell selection module;
   b) controlling flow of the liquid sample through the cell selection module; and
   c) isolating biomarker cells from the liquid sample.

2. The method of claim 1, wherein the biomarker cells are circulating tumor cells or circulating leukemic cells.

3. The method of claim 1, wherein the method further comprises lysing biomarker cells; and capturing DNA or RNA released from lysed biomarker cells.

4. The method of claim 1, wherein the liquid sample is blood, saliva, lymphatic fluid, cells suspended in fluid, synovial fluid, semen, urine, cerebrospinal fluid, or amniotic fluid.

* * * * *